Figure 3:
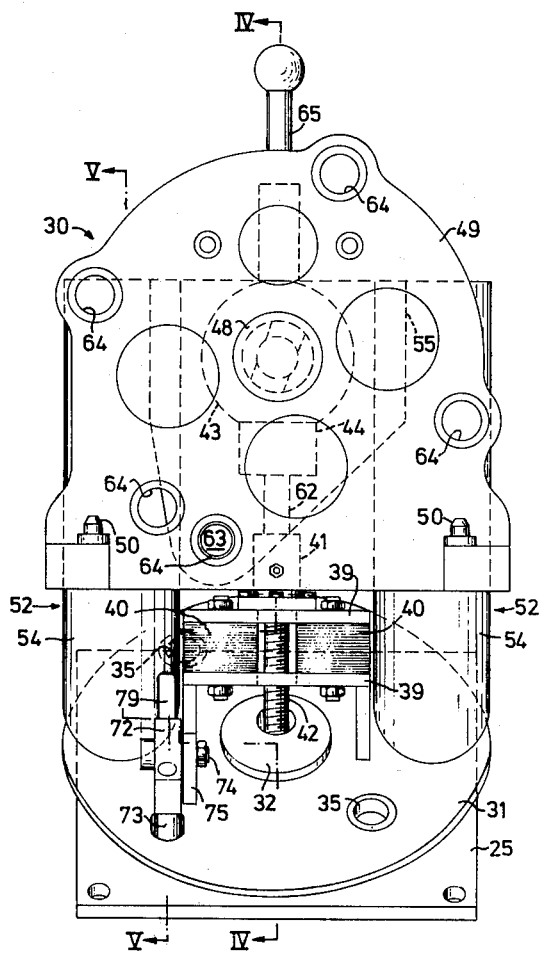

United States Patent [19]

Perhed

[11] 4,018,343
[45] Apr. 19, 1977

[54] REMOTE-CONTROLLED, MOTOR-PROPELLED TRANSPORT CAR FOR THE TRANSPORT OF MOTORS DURING ASSEMBLY AND TESTING, AND A TEST STATION FOR USE TOGETHER WITH THE TRANSPORT CAR

[75] Inventor: Per-Gunnar Arthur Perhed, Skovde, Sweden

[73] Assignee: AB Volvo, Goteborg, Sweden

[22] Filed: July 7, 1975

[21] Appl. No.: 593,455

[30] Foreign Application Priority Data

July 11, 1974 Sweden .............................. 7409137

[52] U.S. Cl. ................................ 214/1 Q; 29/705;
29/822; 29/430; 73/116; 180/1 R; 180/27;
269/56

[51] Int. Cl.² .......................................... B23Q 7/00

[58] Field of Search ................. 180/98, 25 R, 26 R,
180/26 A, 27, 1 R, 21; 214/1 Q, 1 QF, 330;
187/9 R; 29/200 P, 200 J, 208 R, 430; 248/8,
2; 269/55, 56; 73/116, 117.1

[56] References Cited

UNITED STATES PATENTS

| 2,329,613 | 9/1943 | Hokanson | 214/330 X |
|---|---|---|---|
| 2,627,109 | 2/1953 | Bock | 214/1 QF X |
| 3,538,759 | 11/1970 | Schrom | 73/116 |
| 3,598,196 | 8/1971 | Ballantyne | 180/98 X |
| 3,675,914 | 7/1972 | Douglass | 73/116 X |

Primary Examiner—Robert R. Song
Assistant Examiner—John P. Silverstrim
Attorney, Agent, or Firm—Young & Thompson

[57] ABSTRACT

The present invention relates to a transport car for the transportation of motor parts or complete motors along an assembly path consisting of sequential working stations. The transport car has a fixture for the motor parts or the motor, which can be adjusted between an assembly position in which it maintains a rigid connection between the motor and the car and a testing position in which it maintains a resilient connection between the motor and the car.

10 Claims, 6 Drawing Figures

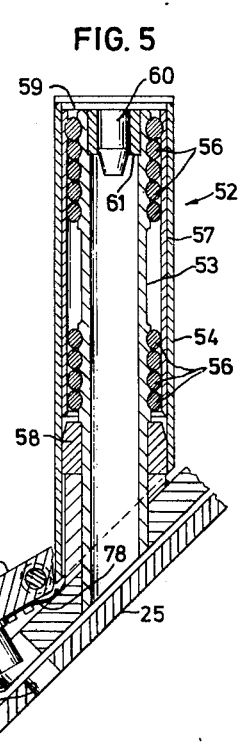
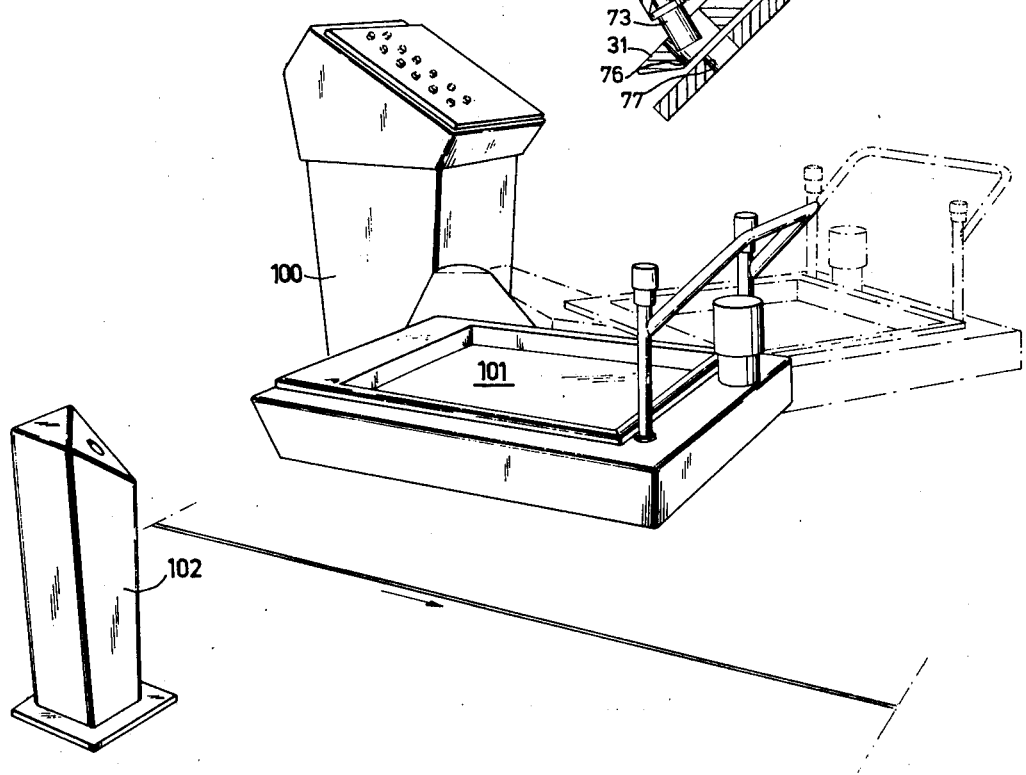

REMOTE-CONTROLLED, MOTOR-PROPELLED TRANSPORT CAR FOR THE TRANSPORT OF MOTORS DURING ASSEMBLY AND TESTING, AND A TEST STATION FOR USE TOGETHER WITH THE TRANSPORT CAR

The present invention relates to a transport car for transporting motor parts or complete motors along a path to sequential working stations, said transport car comprising a base frame having at least three wheels, at least one of which is steerable and at least one of which is driven by a motor, a signal receiver which is arranged to receive signals from a signal transmitting arrangement which operates along said path in order to regulate the operating state and running direction of the car in relation to the signals from the signal transmitting arrangement and a fixture which is carried by the base frame, said fixture being for the motor parts or the motor.

In the use of a car of the kind disclosed above for the assembly of motors, the completed motor must be moved to a test bench for testing. During assembly the fixture must maintain a rigid connection between the motor and the car. This entails that the motor cannot be test run on the car which contains sensitive electrical equipment which could be damaged. Thus, the completed motor must be moved to a conventional test bench with the help of, for example, an overhead conveyor.

The purpose of the present invention is to eliminate the need for moving the motor for testing and to achieve a car which can carry the motor during testing as well as assembly.

This is achieved according to the invention by means of the fixture being provided with arrangements which render said fixture adjustable between an assembly position in which it maintains a rigid connection between the motor and the car and a test position in which it maintains a resilient connection between the motor and the car. By means of this adjustment possibility, the car can be used for both assembly and testing as the resilient suspension of the motor in the test position moderates or mutes the vibrations coming from the motor.

However, the use of a car of this type as a test bench means that known kinds of test stations are no longer well-adapted or expedient as, in addition to a control pulpit and motor connections for oil, water, fuel, etc., said test stations also comprise a stationary bench for the motor, under which bench a spill trough is arranged for collecting leaking oil etc. from the motor.

A test station especially designed for use together with the transport car according to the present invention is characterized in that, beyond the fact that it lacks a bench for the motor, the spill trough is movable in the transverse direction of the car path between a position under the motor mounted on a car driven to the station and a withdrawn position which allows the car to leave the station in an unaltered running direction.

The invention is described in more detail below with reference to the accompanying drawings showing an embodiment of the invention.

Figure 1:
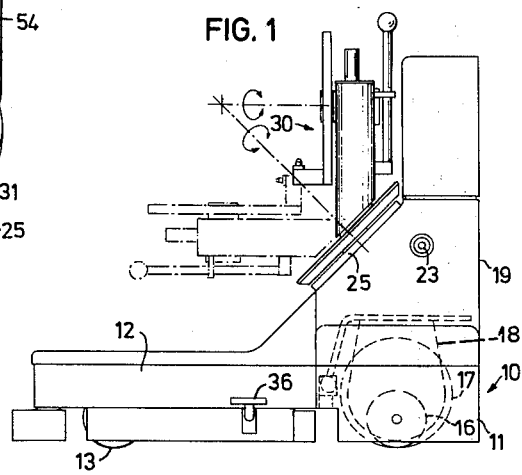
Figure 2:
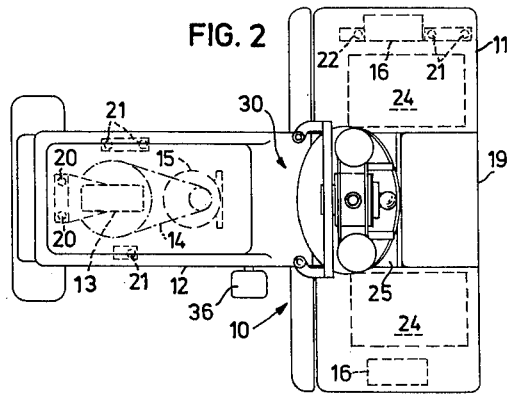
Figure 4:
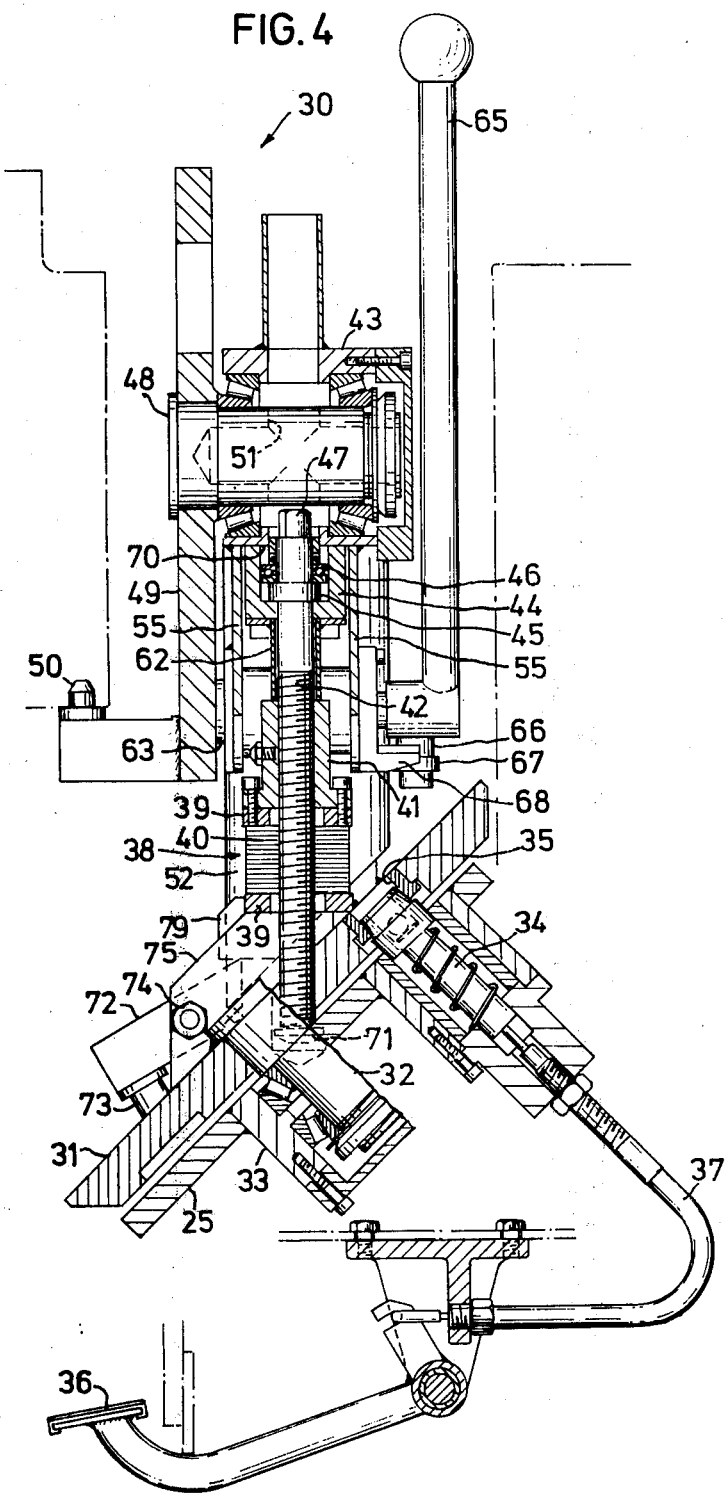

FIGS. 1 and 2 show a schematic side view and top plan view of a transport car according to the present invention, FIG. 3 shows a elevational view of the motor fixture, FIG. 4 is a longitudinal section of FIG. 3 along line IV—IV, FIG. 5 is a longitudinal section along line V—V in FIG. 3, and FIG. 6 is a schematic perspective view of a test station.

The car illustrated in FIGS. 1 and 2 has a T-shaped base frame 10, comprising a main section 11 and a support section 12 which projects outwards centrally from said main section. A guide wheel 13 is arranged in the vicinity of the front end of the support section 12, said guide wheel being able to be pivoted around a vertical axle. The guide wheel is coupled to a guide motor 15 by means of a chain or belt 14. The main section 11 has two outer, freely rotatable support wheels 16 and a larger, resiliently suspended drive wheel 17 arranged between said support wheels. The drive wheel 17 is coupled to a drive motor (not shown here) by means of a chain 18. The need for a differential gear is eliminated by the arrangement described above.

A frame 19 is arranged centrally on the main section 11 of the base frame, said frame 19 containing the electronic steering arrangement (not shown here) for the car. Said electronic steering arrangement controls the guide motor and the drive motor of the car via an electric control wire which is arranged in the floor of the same. The signals from the control wire are picked up by various antennae 20, 21 and 22. The antennae 20 are control antennae which swing concurrently with the guide wheel 13, antennae 21 are start and stop antennae, and antennae 22 are registration antennae. The frame 19 has a control lever (not shown here) for manual manoeuvring of the car and a charge output 23 for charging the batteries 24 which are arranged in the base frame on both sides of the frame 19.

The frame 19 carries a motor fixture on a plate 25 which inclines toward the support section 12 at a 45° angle. Said motor fixture is generally referred to with reference numeral 30 and is shown in more detail in FIGS. 3–5. The fixture comprises an index plate 31 having a shaft 32 which is turnably journalled in a hub 33 which is shaped into plate 25. The index plate 31 is locked against rotation by means of a locking cylinder 34 which can be caused to engage into one of two diametrically opposed holes 35 in the index plate, said plate being adjustable in two assembly positions which are situated 180° from each other as shall be described later on below. The locking engagement is controlled by means of a foot pedal 36 via a control cable 37 which is connected to the cylinder 34.

A damping element 38 is arranged centrally on the index plate 31, said damping element 38 comprising two plates 39, between which intermediate rubber cushions 40 are arranged. The upper plate 39 supports an inwardly threaded casing 41, through which an elongated screw 42 extends. The screw 42 is, in the vicinity of its upper end, rotatably journalled in a part 44 which is connected to a hub or bearing casing 43 and which receives a flange 45 on the screw 42 and an axial bearing 46. The upper end of the screw 42 is provided with a six-edged portion 47 with which a tool is intended to engage in order to turn the screw. A shaft 48 is rotatably journalled in the bearing housing 43, said shaft supporting an attachment plate 49 for a motor. The motor is suspended on the attachment plate 49 in the rear end of the engine block by means of attachments 50 and bolts (not shown here). In order to make engagement between the six-edged portion of the screw 47 and a tool (not shown here) possible, a bore 51 passes through the shaft 48.

A telescopic device 52 is arranged on both sides of the bearing housing 43 of the attachment plate 49, said device connecting the index plate 31 to the bearing housing 43. Each telescopic device 52 comprises an inner tube 53 which is rigidly connected to the index plate 31 and an outer tube 54. Both of the outer tubes are connected to each other and the bearing housing 43 by means of forward and rear plates 55. The inner tube 53 carries several concentric rings 56 made of a flexible material, outside of which a casing 57 is arranged. Furthermore, a metal ring 58 having the same diameter as the casing 57 and corresponding to the inner diameter of the outer tube is arranged on the lower end of the inner tube 53. The upper end of the outer tube 54 is sealed by a plate 59, on which a pin 60 is arranged, said pin having an outer diameter corresponding to the inner diameter of a bushing 61 which is arranged on the upper end of the inner tube.

When the screw 42 is in the screwed-in position as shown in FIGS. 3 and 4, whereby a casing 62 connected to part 44 rests against the upper surface of the threaded casing 41, the two telescopic devices 52 assume the position shown in FIG. 5. In said position the plate 59 of the outer telescopic tube 54 rests against the upper edge of the inner telescopic tube 53 so that a vertically rigid connection is achieved between the bearing housing 43 and the index plate 31 and, consequently, between the motor and the car. Simultaneously, a transverse rigid connection is achieved by means of cooperation between the pin 60 and the bushing 61 and the ring 58 and the outer telescopic tube 54. The fixture is now positioned in the so-called assembly position in which the motor, during assembly, can be rotated around its longitudinal axis by means of turning the attachment plate 49. The attachment plate can be fixed in distinctive assembly positions by means of a locking cylinder 63 which can be brought into engagement with various bores 64 in the attachment plate 49. The locking cylinder 63 is resiliently loaded in a direction towards the attachment plate 49 and is connected to a control lever 65 which has a king pin 66 having a cam cylinder 67 which runs along a cam bar 68. When the control lever 65 is moved forwards or backwards in a plane which is parallel to the attachment plate 49, the locking cylinder 63 is moved out of engagement with the bores 64 by means of cooperation between the cam cylinder 67 and the cam bar 68. During assembly, the motor can also be arranged vertically with its forward end pointing upwards. This is accomplished by means of the locking cylinder 34 of the index plate 31 being disengaged from the index plate by means of the pedal 36, after which the index plate is turned 180° so that the fixture assumes the position shown in FIG. 1 by means of dashes. By means of arranging the shafts 32 and 48 so that their geometric axes intersect each other in or near the centre of gravity of the motor, the motor can be easily turned and height change during adjustment becomes slight.

In order to adjust the fixture from the above-described rigid assembly position to a resilient testing position, the screw 42 is turned counterclockwise by means of a tool which is inserted in the shaft bore 51 and engages with the six-edged portion 47 of the screw. Initial turning of the screw results in that the screw is first moved upwards in relation to the bearing housing 43 until the upper bearing path of the bearing 46 abuts the bottom side 70 of the bearing housing. The six-edged portion 47 projects now into the bore 51 and locks the shaft 48 against turning even if the locking cylinder 63 should accidentally disengage from a bore 64. During continued turning of the screw 42, the bearing housing 43 is lifted and the parts connected thereto are also lifted in relation to the nut 41 carried by the damping element 38. The screw is turned so far that a plate 71 attached to the lower end of the same abuts the bottom side of the nut 41. In practice, this entails that the bearing housing 42 is lifted about 125 mm. Simultaneously, the outer tubes 54 of the telescopic devices 52 are lifted a corresponding distance, said outer tubes being connected to the bearing housing 43 via the plates 55. The pin 60 is herewith disengaged from the bushing 61 and the bottom edge of the tube 54 is moved so that it lies above the ring 58. The tube 54 is now guided on only the casing 57 carried by the flexible rings 56. In this thusly achieved testing position the damping element 38 and the telescopic devices 52 achieve a vertical and transverse resilient connection between the bearing housing 43 and the index plate 31 and, consequently, between the motor and the car so that no damaging vibrations can be transmitted from the motor to the electric equipment in the car.

In order to prevent turning of the index plate 31 by means of accidental release of the cylinder 34 from locking engagement with the index plate during test running of the motor, a safety lock is arranged to automatically lock the index plate when the fixture is adjusted from the assembly position to the testing position. The safety lock comprises a lever 72 having a locking cylinder 73. The lever is tiltably journalled on a shaft 74 which is arranged on an element 75 which is connected to the bottom plate 39 of the moderating element 38. Bores 76 and 77 are arranged in the index plate 31 and plate 25 in front of the locking cylinder 73, into which bores the locking cylinder 73 can be inserted in order to lock together the two plates 25 and 31. The lever is loaded against the locking position by means of a plate spring 78 and is held out of locking engagement in the assembly position of the fixture by means of a boss 79 which is attached to one of the telescopic tubes 54, said boss pressing against the rear end of the lever. When the fixture is adjusted to the testing position, the boss 79 is lifted from the lever 72 which, under the influence of the spring 78, is turned counterclockwise (as seen in FIGS. 4 and 5), whereby the cylinder 73 is inserted into bores 76 and 77.

FIG. 6 is a schematic view of a testing station which is especially designed for use together with a transport car of the type described above. The station comprises a control pulpit 100 having a spill trough 101 which is swingably journalled on a vertical shaft and in which connections (not shown here) for oil, water, fuel, etc. are arranged. The pulpit is positioned along the path in such a manner that a car driven to the station turns the intake side of the motor supported by the fixture towards the pulpit, the spill trough 101, in the forwardly swung position shown in FIG. 6 by means of solid lines, being situated under the motor. A column in which an exhaust tube or hose is contained and insulated is arranged on the opposite side of the car, i.e. on the exhaust side of the motor.

After test running of the motor on the car, the spill trough 101 is swung to the position illustrated by dashes so that the car can pass through the station. i.e., continue on to the next work station in the same direction of movement with which it arrived at the test station.

What I claim is:

1. A transport car for transporting motor parts or a complete motor along a path to sequential working stations including a testing station and for supporting said motor parts or motor during various work operations including testing, said transport car comprising a base frame having at least three wheels, at least one of which is steerable and at least one of which is driven, and a fixture mounted on said base frame for carrying said motor parts or motor, said fixture comprising means for selectively connecting said motor to said car in either a rigid, assembly-facilitating condition or a resilient, testing-facilitating condition.

2. Transport car according to claim 1, characterized in that the fixture comprises an attachment plate for a said motor, said attachment plate being rotatable around a horizontal rotation shaft, and means for adjustment of the fixture, comprising a screw-nut arrangement by means of which the attachment plate can be raised and lowered between a lower assembly position and a testing position which is raised in relation to said assembly position.

3. Transport car according to claim 2, characterized in that, in the testing position, the attachment plate is suspended on first resilient means for moderating vertical vibrations and second resilient means for moderating transverse vibrations.

4. Transport car according to claim 3, characterized in that the nut of the screw-nut arrangement is carried on the first resilient means and that the screw is turnably journalled in a construction part connected to the bearing housing for the shaft of the attachment plate, whereby the second resilient means comprise two telescopic devices, each of which is arranged on a respective side of said first resilient means, each telescopic device having a part which is rigidly connected to the car and a second part which is rigidly connected to the bearing housing, an intermediate layer of resilient material being arranged between said two parts.

5. Transport car according to claim 4, characterized in that one part of the telescopic devices has a concentric, outwardly-arranged ring of rigid material and the other part has a concentric, inwardly-arranged pin of rigid material, said ring and pin, in the assembly position, guiding the two parts of the telescopic devices in relation to each other and maintaining a transverse rigid connection between the motor and the car, and in that one part is provided with an end stop which limits axial movement of the parts towards each other and, in the assembly position, maintains a vertical rigid connection between the motor and the car.

6. Transport car according to claim 4, characterized in that the upper end of the screw is situated under the shaft of the attachment plate, that the rotation shafts of the screw and the attachment plate intersect each other and that the shaft of the attachment plate has a radial bore passing completely through the shaft in order to make possible the turning of the screw by means of a tool passed through the bore.

7. Transport car according to claim 1, characterized in that a screw-nut arrangement supports an attachment plate of an index plate which inclines at a 45° angle and is rotatably journalled on the car, by means of which index plate the attachment plate can be adjusted between a vertical and a horizontal position.

8. Transport car according to claim 7, characterized in that the index plate has a locking arrangement which is arranged to automatically lock the index plate against rotation when adjustment is being made between the assembly position and the testing position.

9. A transport car as claimed in claim 1 wherein said testing station comprises a control pulpit and a spill trough for collecting leaking oil from the motor, characterized in that the spill trough can be moved in the transverse direction of the car path between a position under the motor on a car which has been forwarded to the testing station and a withdrawn position which allows the car to leave the station in an unaltered operating direction.

10. A transport car as claimed in claim 9 wherein said spill trough is swingably journalled around a vertical shaft which is arranged outside of the transverse profile of the car.

* * * * *